(12) United States Patent
Peterson

(10) Patent No.: US 8,416,517 B1
(45) Date of Patent: Apr. 9, 2013

(54) SURVIVAL ACCESSORY

(76) Inventor: Gordan Peterson, Auburn, KY (US)

(*) Notice: Subject to any disclaimer, the term of this patent is extended or adjusted under 35 U.S.C. 154(b) by 124 days.

(21) Appl. No.: 13/153,400

(22) Filed: Jun. 4, 2011

(51) Int. Cl.
*G02B 7/02* (2006.01)
*B23K 26/06* (2006.01)
*F24J 2/08* (2006.01)

(52) U.S. Cl.
USPC ........... 359/815; 359/811; 359/819; 359/827; 219/121.6; 219/121.75; 126/680; 126/698

(58) Field of Classification Search .................. 359/811, 359/815, 819, 823, 824, 827; 356/315, 437; 123/143 B, 143 R; 219/262, 270, 552
See application file for complete search history.

(56) References Cited

U.S. PATENT DOCUMENTS

| | | | | |
|---|---|---|---|---|
| 2,849,585 A * | 8/1958 | Evans | ............................ | 219/262 |
| 4,254,761 A * | 3/1981 | Armas et al. | .................... | 126/680 |
| 5,221,820 A * | 6/1993 | Shimoji | ...................... | 219/121.6 |
| 5,268,553 A * | 12/1993 | Shimoji | ...................... | 219/121.6 |
| 7,333,204 B2 * | 2/2008 | Lancelin et al. | ............... | 356/437 |
| 8,127,732 B2 * | 3/2012 | Kopecek et al. | ........... | 123/143 B |

* cited by examiner

Primary Examiner — Loha Ben
(74) Attorney, Agent, or Firm — Gulf Coast Intellectual Property Group

(57) ABSTRACT

A survival apparatus operable to ignite a combustible material wherein the survival apparatus additionally functions as a zipper pull-tab for an article of clothing. The survival apparatus further includes a body that is substantially rigid and generally rectangular in shape. The body includes a first aperture that is oval in shape and has a convex lens mounted therein. A coating is disposed over the body operable to substantially inhibit damage to the lens mounted within the first aperture during use as a zipper pull. A release strip is intermediate the body and the coating wherein the release strip further includes a tab providing an interface to engage the release strip.

19 Claims, 1 Drawing Sheet

SURVIVAL ACCESSORY

FIELD OF THE INVENTION

The present invention relates to a survival accessory, more specifically but not by way of limitation, a survival accessory operable to be coupled to an article of clothing or similar item that functions to provide a method to initiate a fire and provide an operable function for the article of clothing.

BACKGROUND

Millions of individuals engage in outdoor sports such as but not limited to hiking on a routine basis. Outdoor sports such as hiking, skiing or other activities will routinely lead the participant in a direction that is significantly removed from populated areas. Participants often seek this type of refuge as a method to escape or challenge themselves physically. Individuals engaged in these types of activities will often carry various supplies in order to be properly provisioned for the duration of their trip. During inclimate weather, participants in outdoor sports such as the aforementioned will typically wear a jacket or similar article of clothing to provide protection from the inclimate weather.

One issue with preparing for a hiking trip is the limited amount of supplies that can be typically carried utilizing items such as backpacks. Hikers that will pack for as little as a day must often utilize the capacity provided by their backpack for items such as additional clothes, water, food and additional camping type supplies. Additionally, individuals preparing for a longer duration will typically pack the same types of material only in different quantities. Another issue for outdoorsman is that inclimate weather can present challenges for materials that may have been packed in order to be utilized during the trip. For example but not by way of limitation, participants will typically pack a method to initiate a fire such as a lighter or matches. Lighters have proven difficult to use during periods of high wind and matches can routinely be lost or damaged rendering them inoperable. Both of these types of items are carried in a finite supply and once the supply has been depleted, the individual has no additional tools to replace the functionality of these items.

Accordingly, there is a need for a device that can be operably coupled to a backpack or an article of clothing that can provide fire ignition capabilities that is durable, weatherproof and is easily transported as an integral piece of an article of clothing or item such as but not limited to a backpack.

SUMMARY OF THE INVENTION

An object of the present invention is to provide a survival apparatus that can be operably secured to an article of clothing or item such as a backpack that functions to provide a fire ignition method.

Another object of the present invention is to provide a survival apparatus that can be operably secured to an article of clothing that additionally functions as a zipper pull-tab.

Still another object of the present invention is to provide a survival apparatus that provides an element of functionality for an article of clothing and additionally is capable of igniting a fire wherein the survival apparatus includes a large centrally located aperture.

An additional object of the present invention is to provide a survival apparatus that provides functionality as an element of an article of clothing that further functions as a fire ignition device that includes a convex lens disposed within the centrally located aperture.

Yet a further object of the present invention is to provide a survival apparatus that provides functionality as an element of an article of clothing and is capable of igniting a fire that is coated in a protective layer.

Another object of the present invention is to provide a survival apparatus that provides functionality as a zipper pull-tab and is further capable of igniting a fire that is lightweight and easy to use.

Still a further object of the present invention is to provide a survival apparatus that provides functionality as a zipper pull-tab and is additionally capable of fire ignition that includes a mechanism to remove the protective layer.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION OF THE PREFERRED EMBODIMENT

Figure 1:
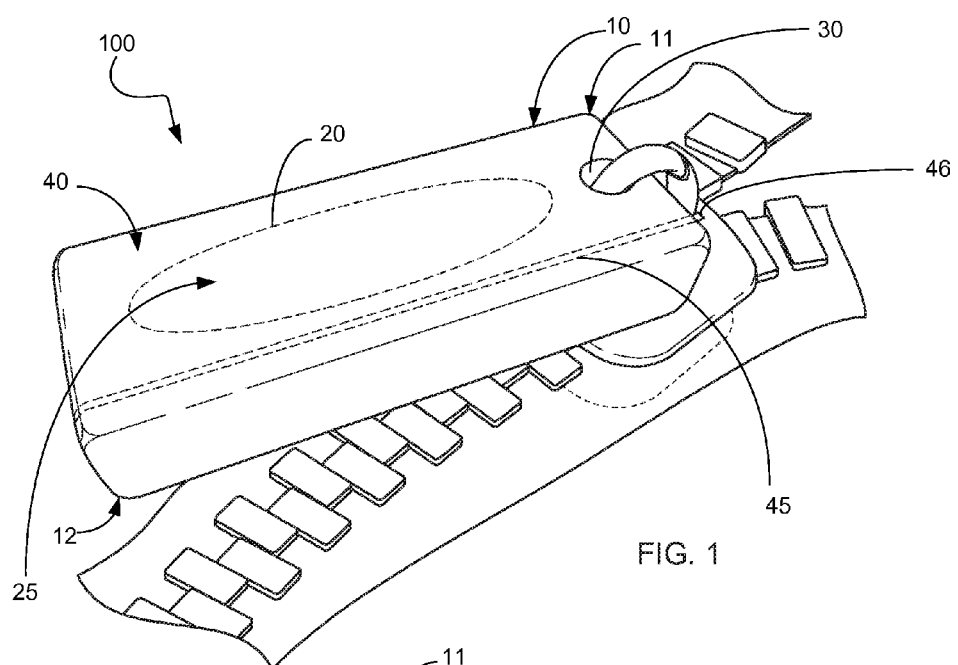
FIG. 1 is a perspective view of an embodiment of the present invention having the outer coating disposed thereon.

Referring now to the drawings submitted herewith, wherein various elements depicted therein are not necessarily drawn to scale and wherein through the views and figures like elements are referenced with identical reference numerals, there is illustrated a survival apparatus 100 constructed according to the principles of the present invention.

The survival apparatus 100 further includes a body 10 that is generally rectangular in shape. The body 10 is manufactured from a suitable durable material such as but not limited to plastic or metal. While the preferred embodiment of the survival apparatus 100 illustrated herein includes a body 10 that is rectangular in shape, it is contemplated within the scope of the present invention that the body 10 could be formed in numerous different shapes. While no particular size of the body is required, good results have been achieved utilizing a body 10 that is approximately two inches in length, three-quarters of an inch in width and three-quarters of an inch in thickness.

A first aperture 20 is journaled through the body 10. The first aperture 20 is generally oval in shape. The first aperture 20 is sized such that the first aperture 20 has a length that is approximately seventy percent of the length of the body 10. While good results have been achieved with a first aperture 20 having a length that is approximately seventy percent of the length of the body, it is contemplated within the scope of the present invention that the first aperture 20 could be manufactured in different lengths. It is further contemplated within the scope of the present invention that while the first aperture 20 is generally oval in shape, the first aperture 20 could be manufactured in numerous different shapes.

A second aperture 30 is journaled through the body 10 proximate the first end 11. The second aperture 30 is generally annular in shape and functions to movably secure the survival apparatus 100 to an article of clothing such as but not limited to a conventional zipper as shown in FIG. 1. It is contemplated within the scope of the present invention that the second aperture 30 is sized so as to accommodate conventional fastening mechanisms such as but not limited to d-rings to allow the survival apparatus 100 to be operably coupled to clothes or items such as but not limited to backpacks. Those skilled in the art will recognize that the body 10 could be movably secured to an article of clothing or other item utilizing numerous suitable methods and fasteners. It is additionally contemplated within the scope of the present invention that the body 10 could be releasably secured to an article of clothing or other item utilizing a conventional releasable fastener that operably couples the survival apparatus 100 with an article of clothing or other item wherein the second aperture 30 receives a first portion of the releasable fastener and the article of clothing or other item is operably engaged with a second portion of the releasable fastener. While the second aperture 30 is illustrated herein as being annular in shape, it is contemplated within the scope of the present invention that the second aperture 30 could be formed in numerous different shapes.

Disposed substantially over the body 10 is a coating 40. The coating 40 is manufactured from a suitable durable coating such as but not limited to silicon, rubber or plastic. The coating 40 functions to protect the body 10 from damage so as to maintain the integrity of the lens 25 that is mounted within the first aperture 20. The coating 40 is removable via a release strip 45 that is intermediate the body 10 and the coating 40 and positioned longitudinally along the body 10 extending from the first end 11 to the second end 12. The release strip 45 is manufactured from a suitable durable material such as but not limited to plastic. The release strip 45 further includes end 46 that extends outward from the coating 40 providing an interface for the user to grasp the release strip 45 and apply force so as to fracture the coating 40 enabling the user to remove the coating 40 so as to utilize the lens 25 when required. While the release strip 45 is illustrated herein as being longitudinally positioned along the body 10, it is contemplated within the scope of the present invention that the release strip 45 could be laterally positioned across the body 10. Furthermore, while one release strip 45 is illustrated herein, it is additionally contemplated within the scope of the present invention that more than one release strip 45 could be utilized. While good results have been achieved utilizing a coating 40 that is manufactured from a silicon, rubber or plastic material, it is further contemplated within the scope of the present invention, that the coating 40 be manufactured from a combustible material such that the coating 40 will provide an initial source of material to create a fire during utilization of the survival apparatus 100.

The lens 25 mounted within the first aperture 20 is a convex shaped lens and is manufactured from a suitable durable material such as but not limited to polycarbonate. The lens 25 is mounted within the first aperture 20 utilizing suitable durable methods such as but not limited to chemical adhesion. The convex shaped lens 25 allows a user to utilize the survival apparatus 100 to initiate a fire in an emergency situation or where a fire is required. The convex shaped lens 25 utilizes the heat from the sun to initiate a fire. The body 10 of the survival apparatus 100 is positioned such that the light rays from the sun pass through the lens 25 and are focused in a small point on a material that is combustible. The convex shape of the lens 25 facilitates the creation of a highly focalized light source providing sufficient heat to initiate combustion of a source such as but not limited to dry wood. As previously discussed herein, the coating 40 could be utilized as an initial source to create a fire wherein the coating 40 is removed from the body 10 and placed in a position such that a user can utilize the lens 25 to focus the sun's light rays thereon to initiate a fire.

Figure 2:
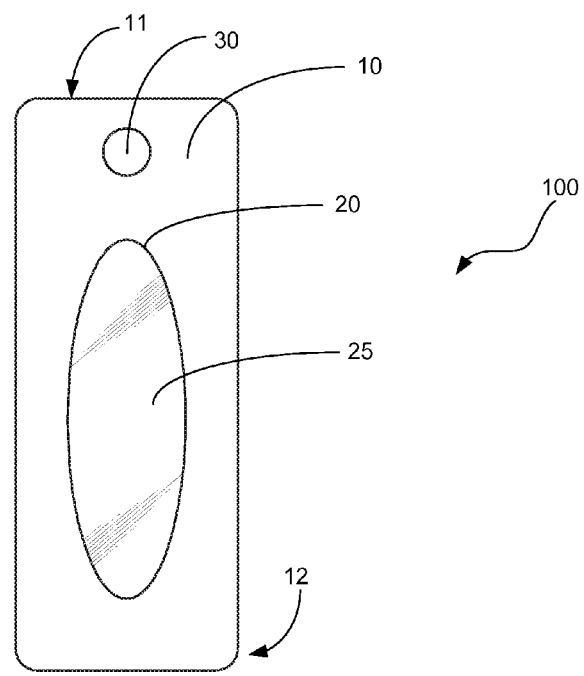
FIG. 2 is a top view of the embodiment of the present invention wherein the outer coating has been removed therefrom.

Referring in particular to FIGS. 1 and 2, a description of the operation of the survival apparatus is as follows. The survival apparatus 100 is secured to an article of clothing and utilized to provide a first function such as but not limited to a conventional zipper pull-tab. In the first mode, the survival apparatus 100 is utilized as a zipper pull-tab to release or engage the teeth of a zipper on an article of clothing or other item such as a backpack. In a second mode, the survival apparatus 100 is utilized to ignite a combustible material. Ensuing the need for a user to create a fire, the user will grasp end 46 of the release strip 45 and apply a force so as to fracture the coating 40 disposed on the body 10. The coating 40 is completely removed from the body 10. The body 10 is positioned over a source of combustible material at a distance such that the light of the sun passing through the lens 25 is highly focalized in a small beam so as to create a heat source sufficient to light the combustible material and initiate a fire.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A survival apparatus comprising:
    a body, said body being generally rectangular in shape, said body having a first end and a second end, said body being substantially rigid;
    a first aperture, said first aperture journaled through said body;
    a lens, said lens mounted within said first aperture, said lens operable to focus light rays in a concentrated point enabling an ignition of a combustible material; and
    a coating, said coating being substantially disposed over said body, said coating operable to substantially inhibit damage to said lens.

2. The survival apparatus as recited in claim 1, and further including a second aperture, said second aperture being proximate said first end of said body, said second aperture operable to receive a fastener, said second aperture for securing the survival apparatus to an item of clothing.

3. The survival apparatus as recited in claim 2, and further including a release strip, said release strip being intermediate said body and said coating, said release strip configured to fracture said coating for subsequent removal thereof.

4. The survival apparatus as recited in claim 3, wherein said lens is generally convex in shape.

5. The survival apparatus as recited in claim 4, wherein said lens is manufactured from polycarbonate.

6. The survival apparatus as recited in claim 5, wherein said first aperture is generally oval in shape.

7. A survival apparatus being secured to an article of clothing comprising:

a body, said body being rectangular in shape, said body having a first end and a second end, said body being substantially rigid;

a first aperture, said first aperture being generally oval in shape;

a focal lens, said focal lens being mounted within said first aperture, said focal lens being convex in shape; and a coating, said coating being disposed over said body, said coating covering said first aperture, said coating substantially inhibiting damage to said focal lens, said coating having a first position and a second position, wherein in said first position said coating is disposed over said body;

wherein said survival apparatus is operable to utilize the sun's light rays to ignite a combustible material.

8. The survival apparatus as recited in claim 7, and further including a release strip, said release strip extending from said first end of said body to said second end of said body, said release strip operable to place said coating in said second position, wherein in said second position said coating is removed from said body.

9. The survival apparatus as recited in claim 8, and further including a second aperture, said second aperture being annular in shape, said second aperture being proximate said first end of said body, said second aperture configured to receive a fastener so as to secure said body to an article of clothing.

10. The survival apparatus as recited in claim 9, wherein said first aperture is manufactured of a length that is approximately seventy percent the length of said body.

11. The survival apparatus as recited in claim 10, wherein said release strip further includes a tab, said tab extending outward from said coating, said tab being proximate said first end of said body.

12. The survival apparatus as recited in claim 11, wherein said body is approximately two inches in length.

13. The survival apparatus as recited in claim 12, wherein said focal lens is manufactured from polycarbonate.

14. A survival apparatus that is integrated with an article of clothing wherein the survival apparatus is configured as a zipper tab on the article of clothing, the survival apparatus comprising:

a body, said body being rectangular in shape, said body having a first end and a second end, said body being substantially rigid;

a first aperture, said first aperture being generally oval in shape;

a lens, said lens being mounted within said first aperture, said lens being convex; and a coating, said coating being disposed over said body, said coating covering said first aperture, said coating having a first position and a second position, said coating covering said lens in said first position;

wherein the survival apparatus is operable in a first mode and in a second mode, said first mode of said survival apparatus operable to release or engage a conventional zipper of an article of clothing, said second mode of said survival apparatus operable to ignite a combustible material.

15. The survival apparatus as recited in claim 14, and further including a second aperture, said second aperture being annular in shape, said second aperture configured to secure said body to a the conventional zipper of the article of clothing.

16. The survival apparatus as recited in claim 15, and further including a release strip, said release strip being intermediate said body and said coating, said release strip extending from said first end of said body to said second end of said body, said release strip operable to place said coating in said second position, wherein in said second position said coating is removed from said body.

17. The survival apparatus as recited in claim 16, wherein said release strip further includes a tab, said tab extending outward from said coating, said tab being proximate said first end, said tab providing an interface to engage said release strip.

18. The survival apparatus as recited in claim 17, wherein said lens is manufactured from polycarbonate.

19. The survival apparatus as recited in claim 18, wherein said first aperture is manufactured of a length that is approximately seventy percent the length of said body.

* * * * *